US012757253B2

(12) United States Patent
Kumagai et al.

(10) Patent No.: US 12,757,253 B2
(45) Date of Patent: Oct. 6, 2026

(54) TERMINAL AND BASE STATION FOR SELECTING RANDOM ACCESS RESOURCE BASED ON CONFIGURATION INFORMATION

(71) Applicant: NTT DOCOMO, INC., Tokyo (JP)

(72) Inventors: Shinya Kumagai, Tokyo (JP); Haruhi Echigo, Tokyo (JP); Daisuke Kurita, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 367 days.

(21) Appl. No.: 18/272,967

(22) PCT Filed: Dec. 14, 2021

(86) PCT No.: PCT/JP2021/046153
§ 371 (c)(1),
(2) Date: Jul. 18, 2023

(87) PCT Pub. No.: WO2022/158175
PCT Pub. Date: Jul. 28, 2022

(65) Prior Publication Data

US 2024/0098799 A1 Mar. 21, 2024

(30) Foreign Application Priority Data

Jan. 25, 2021 (JP) ................................ 2021-009799

(51) Int. Cl.
*H04W 74/0833* (2024.01)
*H04W 74/00* (2009.01)
*H04W 72/51* (2023.01)

(52) U.S. Cl.
CPC ..... *H04W 74/0833* (2013.01); *H04W 74/002* (2013.01); *H04W 72/51* (2023.01)

(58) Field of Classification Search
CPC ......... H04W 74/0833; H04W 74/0836; H04W 74/0838; H04W 74/00; H04W 74/008;
(Continued)

(56) References Cited

U.S. PATENT DOCUMENTS

2014/0098761 A1* 4/2014 Lee ......................... H04W 4/70 370/329
2016/0345308 A1 11/2016 Futaki
(Continued)

FOREIGN PATENT DOCUMENTS

JP 2017076936 A 4/2017
WO 2015/114694 A1 8/2015
WO WO-2020220894 A1 * 11/2020 ........ H04W 74/0833

OTHER PUBLICATIONS

International Search Report issued in PCT/JP2021/046153 on Mar. 8, 2022 (5 pages).
(Continued)

*Primary Examiner* — Warner Wong
(74) *Attorney, Agent, or Firm* — Osha Bergman Watanabe & Burton LLP

(57) ABSTRACT

A terminal includes a receiver configured to receive system information including information pertaining to random access procedures from the base station; a controller configured to select the resources to be used for random access based on the information pertaining to the random access procedure and a device type of the terminal acting as a reference terminal; and a transmitter configured to transmit a random access preamble to the base station using the selected resource, wherein the device type of the reference terminal is a reduced-function terminal type or an enhanced-coverage terminal type.

5 Claims, 6 Drawing Sheets

(58) Field of Classification Search
CPC ....... H04W 74/08; H04W 4/70; H04W 72/51; H04W 88/00; H04W 74/002; H04W 74/006; H04L 12/2856; H04L 74/0836
See application file for complete search history.

(56) References Cited

U.S. PATENT DOCUMENTS

| | | | | |
|---|---|---|---|---|
| 2018/0160453 | A1 | 6/2018 | Lee et al. | |
| 2021/0345343 | A1* | 11/2021 | Taherzadeh Boroujeni ................ | H04W 72/54 |
| 2021/0385870 | A1* | 12/2021 | Liu ......................... | H04W 4/70 |
| 2022/0116982 | A1* | 4/2022 | Lee ....................... | H04W 72/23 |
| 2022/0150986 | A1* | 5/2022 | Shih .................. | H04W 72/0453 |
| 2022/0369388 | A1* | 11/2022 | Liu ........................... | H04L 1/08 |
| 2023/0007702 | A1* | 1/2023 | Park .................. | H04W 74/0833 |
| 2023/0199861 | A1* | 6/2023 | Maamari ............. | H04W 74/002 370/329 |
| 2023/0232459 | A1* | 7/2023 | Chen ................... | H04W 72/563 370/329 |
| 2023/0262753 | A1* | 8/2023 | Axnäs ................. | H04W 74/002 370/329 |
| 2023/0284276 | A1* | 9/2023 | Mu ................... | H04W 74/0891 370/329 |
| 2024/0098796 | A1* | 3/2024 | Miao ................. | H04L 27/26132 |

OTHER PUBLICATIONS

Written Opinion of the International Searching Authority issued in in PCT/JP2021/046153 on Mar. 8, 2022 (4 pages).

Sharp; "Discussion on other issues for reduced capability UEs"; 3GPP TSG RAN WG1 ∩104-e, R1-2101543; e-Meeting; Jan. 25-Feb. 5, 2021 (6 pages).

3GPP TS 38.213 V16.4.0; "3rd Generation Partnership Project; Technical Specification Group Radio Access Network; NR; Physical layer procedures for control (Release 16)"; Dec. 2020 (181 pages).

3GPP TS 38.321 V16.3.0; "3rd Generation Partnership Project; Technical Specification Group Radio Access Network; NR; Medium Access Control (MAC) protocol specification (Release 16)"; Dec. 2020 (156 pages).

Office Action issued in Japanese Patent Application No. 2022-577035, mailed on Oct. 28, 2025 (5 pages).

Office Action issued in Chinese Patent Application No. 202180091661.8, mailed on Apr. 1, 2026 (20 pages).

Office Action issued in Japanese Patent Application No. 2022-577035, mailed on Mar. 17, 2026 (7 pages).

ZTE Corporation; "Discussion on support of Type A PUSCH repetitions for Msg3"; 3GPP TSG RAN WG1 #104e, R1-2100099; e-Meeting; Jan. 25-Feb. 5, 2021 (8 pages).

Intel Corporation; "On Msg3 PUSCH repetition"; 3GPP TSG RAN WG1 #104e, R1-2100669; e-Meeting; Jan. 25-Feb. 5, 2021 (6 pages).

Sharp; "Type A PUSCH repetitions for Msg3"; 3GPP TSG RAN WG1 #104e, R1-2101549; e-Meeting; Jan. 25-Feb. 5, 2021 (5 pages).

Office Action issued in Japanese Patent Application No. 2022-577035; Dated Jul. 21, 2026 (5 pages).

* cited by examiner

TERMINAL AND BASE STATION FOR SELECTING RANDOM ACCESS RESOURCE BASED ON CONFIGURATION INFORMATION

TECHNICAL FIELD

The present invention relates to a terminal, a base station, and a communication method in a wireless communication system.

BACKGROUND ART

In 3GPP (3rd Generation Partnership Project), a wireless communication system (hereinafter referred to as "NR") called 5G or NR (New Radio) is being discussed in order to realize further increase of system capacity, further increase of data transmission speed, and further decrease of delay in the wireless section. Various wireless technologies and network architectures have been discussed in NR to meet requirements such as high capacity systems, high data transmission rate, low delay, multiple terminal simultaneous connections, low cost, power saving, etc. (e.g., Non-Patent Document 1).

In NR, similar to LTE, random access is performed for synchronization establishment or scheduling requests between terminals and base stations. The random access procedure includes Contention-based random access (CBRA) and Contention-free random access (CFRA). In addition, a four-step random access procedure and a two-step random access procedure are specified. (for example, Non-Patent Document 2).

In 3GPP standardization, a new device type (hereinafter referred to as "RedCapUE") with lower cost and lower complexity than an eMBB (enhanced Mobile Broadband) device or a URLLC (Ultra-Reliable and Low Latency Communications) device is being discussed as a Reduced Capability NR device. Also, in the 3GPP standardization, a device that performs repeated transmission of Msg3 in a random access procedure (hereinafter referred to as "CovEnhUE") is being discussed as discussions for enhancing the NR coverage (Coverage enhancements).

RELATED-ART DOCUMENTS

Non-Patent Documents

[Non-Patent Document 1] 3GPP TS 38. 213 V16. 4. 0 (2020 December)

[Non-Patent Document 2] 3GPP TS 38. 321 V16. 3. 0 (2020 December)

DISCLOSURE OF INVENTION

Problems to be Solved by the Invention

In the case of a terminal that is RedCapUE or CovEnhUE, in a case where the coverage enhancement technique is applied to Msg3 in a random access procedure, the terminal is required to be identified at the time of transmission of Msg1 or PRACH (Physical Random Access Channel) in the random access procedure. However, the operation of how to identify the terminal at the time of PRACH transmission has not been specified.

The present invention has been made in view of the foregoing, and is intended to identify a particular type of terminal at the time of performing the random access procedure in a wireless communication system.

Means for Solving the Problems

According to the disclosed technique, there is provided a terminal. The terminal includes: a receiver configured to receive system information including information pertaining to a random access procedure from a base station; a controller configured to select a resource to be used for random access based on the information pertaining to the random access procedure and a type of the terminal itself; and a transmitter configured to transmit a random access preamble to the base station using the selected resource, wherein the type of the terminal itself is a reduced-function terminal type or an enhanced-coverage terminal type.

Advantageous Effect of the Invention

The disclosed technique is capable of identifying a particular type of terminal at the time of performing a random access procedure in a wireless communication system.

DESCRIPTION OF EMBODIMENTS

Hereinafter, embodiments of the present invention will be described with reference to the accompanying drawings. The embodiments described below are examples, and the embodiments to which the present invention is applied are not limited to the following embodiments.

In operating a wireless communication system according to an embodiment of the present invention, existing techniques are used as appropriate. However, an example of the existing technique may be, for example, but is not limited to, an existing LTE. The term "LTE" as used herein shall also have a broad meaning, including LTE-Advanced and LTE-Advanced or later forms (e.g., NR), unless otherwise indicated.

In addition, the embodiments of the present invention described below use terms used in the existing LTE such as SS (Synchronization Signal), PSS (Primary SS), SSS (Secondary SS), PBCH (Physical Broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), and the like. This is for convenience of reference and may be referred to by other names as similar signals, functions, and the like. The above terms in NR correspond to NR-SS, NR-PSS, NR-SSS, NR-PBCH, NR-PRACH, and the like. However, even the signal used for NR is not always specified as "NR-".

In embodiments of the present invention, the duplex method may be a TDD (Time Division Duplex) method, an FDD (Frequency Division Duplex) method, or any other method (e.g., Flexible Duplex, etc.).

Further, in embodiments of the present invention, the wireless parameter or the like is "configured" may mean that a predetermined value is pre-configured or a wireless parameter indicated by the base station 10 or the terminal 20 may be configured.

Figure 1:
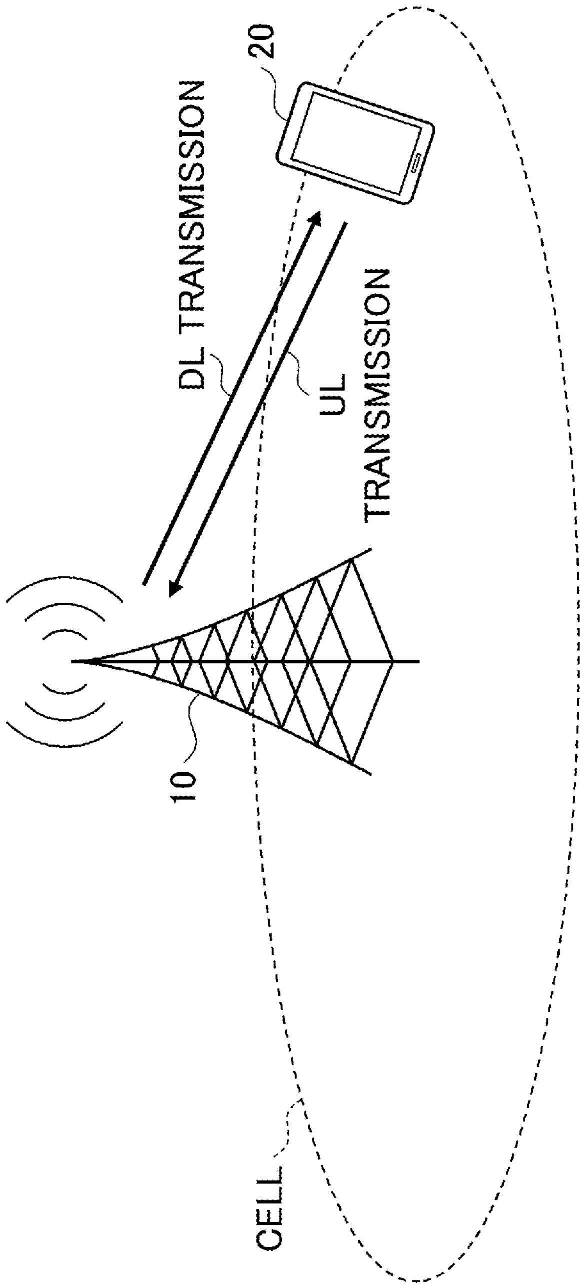
FIG. 1 is a drawing illustrating a wireless communication system in an embodiment of the present invention.
Figure 2:
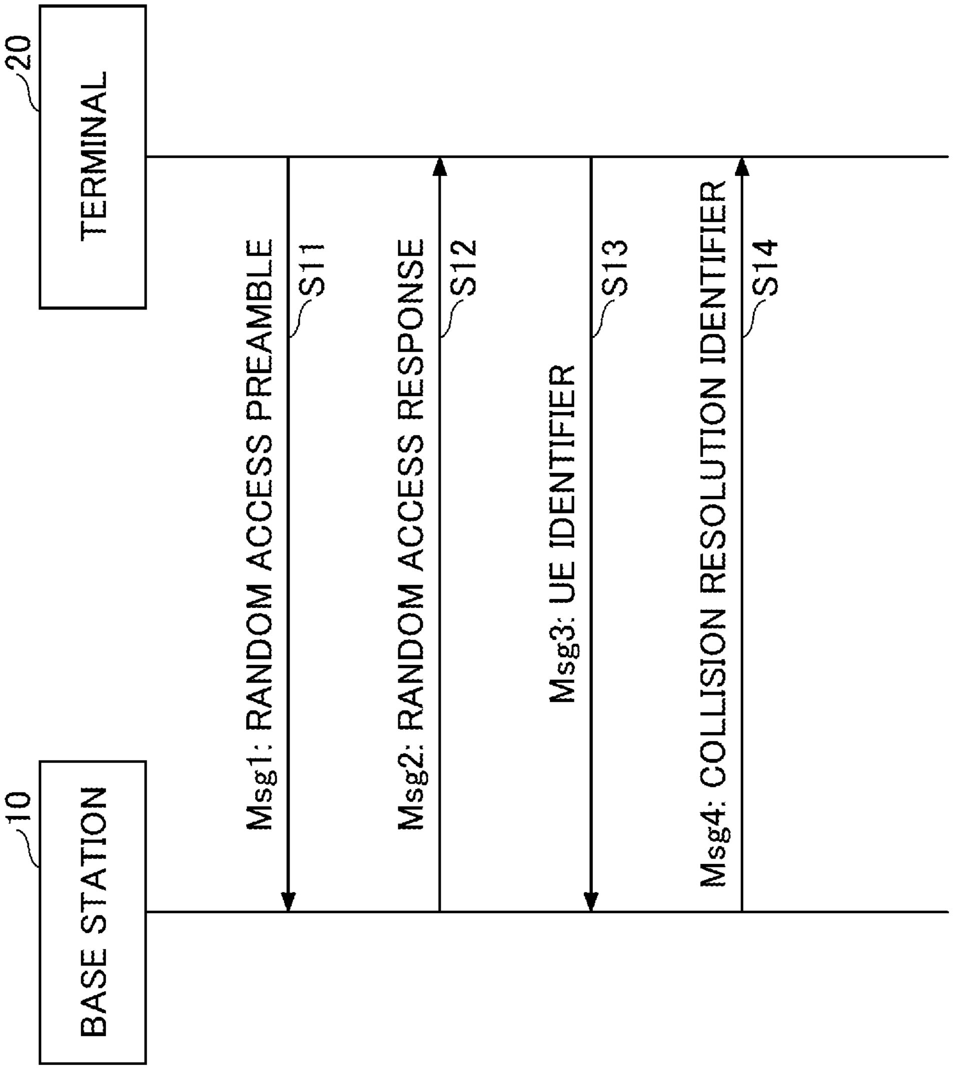
FIG. 2 is a sequence diagram illustrating an example of a four-step random access procedure.

FIG. 1 is a drawing illustrating a wireless communication system in an embodiment of the present invention. The wireless communication system in an embodiment of the present invention includes a base station 10 and a terminal 20, as illustrated in FIG. 1. In FIG. 1, one base station 10 and one terminal 20 are illustrated, but this configuration is an example, and the number of base stations 10 and the number of terminals 20 included in the wireless communication system may be more than one each.

The base station 10 is a communication device that provides one or more cells and performs wireless communication with the terminal 20. The physical resources of the radio signal are defined in the time domain and the frequency domain, the time domain may be defined in terms of OFDM (Orthogonal Frequency Division Multiplexing) symbols, and the frequency domain may be defined in terms of sub-carriers or resource blocks. The TTI (Transmission Time Interval) in the time domain may be a slot or sub-slot, or the TTI may be a sub-frame.

The base station 10 can perform carrier aggregation to communicate with terminal 20 by bundling a plurality of cells (CC (component carriers)). Carrier aggregation uses one primary cell (PCell, Primary Cell) and one or more secondary cells (SCell, Secondary Cell).

The base station 10 transmits synchronization signals and system information to the terminal 20. The synchronization signals are, for example, NR-PSS and NR-SSS. System information is transmitted, for example, by NR-PBCH or PDSCH, and is also called broadcast information. As illustrated in FIG. 1, the base station transmits the control signal or data in DL (Downlink) to the terminal 20 and receives the control signal or data in UL (Uplink) from the terminal 20. Here, what is transmitted by a control channel such as PUCCH and PDCCH is called a control signal, and what is transmitted by a shared channel such as PUSCH and PDSCH is called data. These names are examples.

The terminal 20 is a communication device with a wireless communication function, such as a smartphone, cellular phone, tablet, wearable terminal, and a communication module for M2M (Machine-to-Machine). As illustrated in FIG. 1, the terminal 20 utilizes various communication services provided by a wireless communication system by receiving control signals or data at DL from the base station 10 and transmitting control signals or data at UL to the base station 10. The terminal 20 may be referred to as a UE, and the base station 10 may be referred to as a gNB.

The terminal 20 can provide carrier aggregation for communicating with base station 10 by bundling a plurality of cells (CCs). Carrier aggregation uses one primary cell and one or more secondary cells. PUCCH-SCell having PUCCH may also be used.

Figure 3:
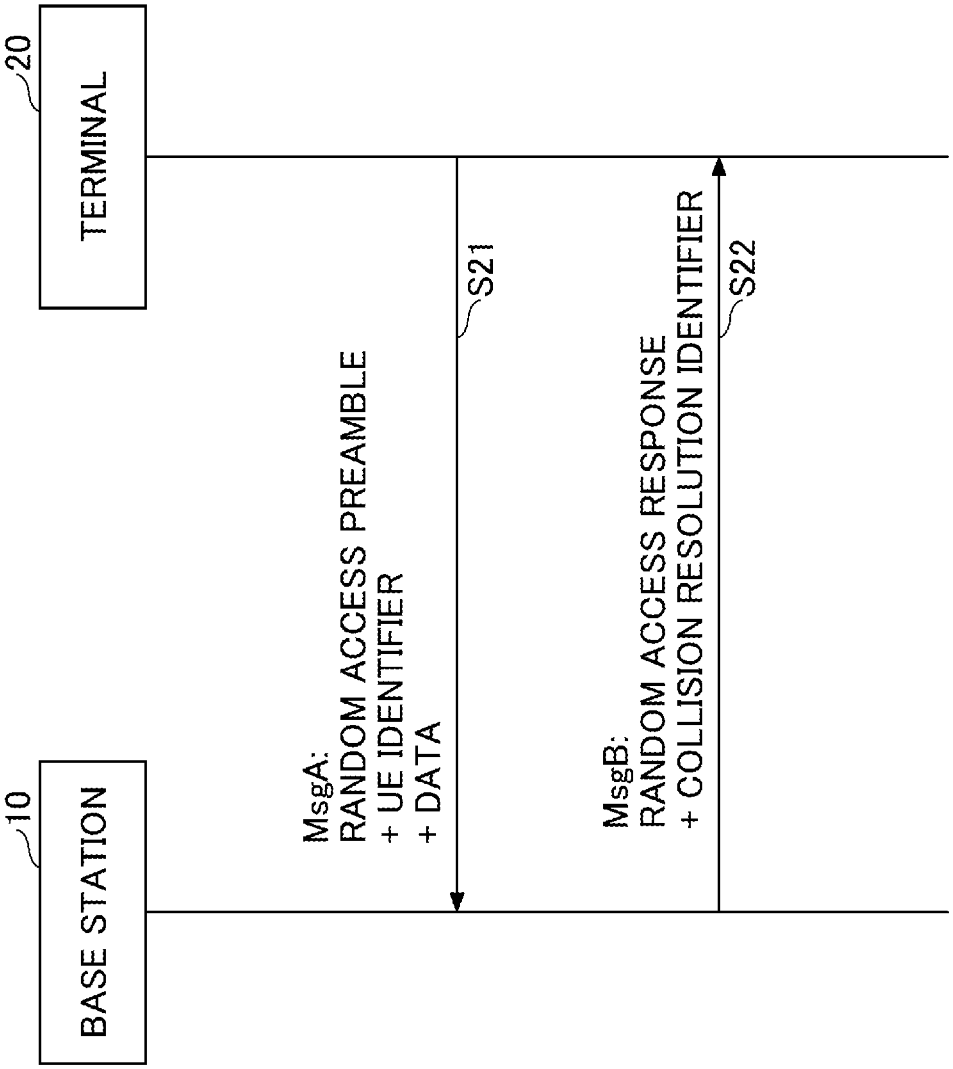
FIG. 3 is a sequence diagram illustrating an example of a two-step random access procedure.

FIG. 3 is a sequence diagram illustrating an example of a four-step random access procedure. An example of a random access procedure illustrated in FIG. 3 is a contention-based four-step random access procedure. In step S11, the terminal 20 transmits a random access preamble (also referred to as a PRACH preamble) as Msg1 to the base station 10. Subsequently, the base station 10 transmits a random access response (RAR, which may be referred to as a Random Access Response) as Msg2 to the terminal 20 (S12). Subsequently, the terminal 20 transmits the UE identifier as Msg3 to the base station 10 (S13). Subsequently, the base station 10 transmits a collision resolution identifier to the terminal 20 for performing the collision resolution as Msg4. When the collision resolution is successful, the random access procedure is successfully completed (S14).

Figure 4:
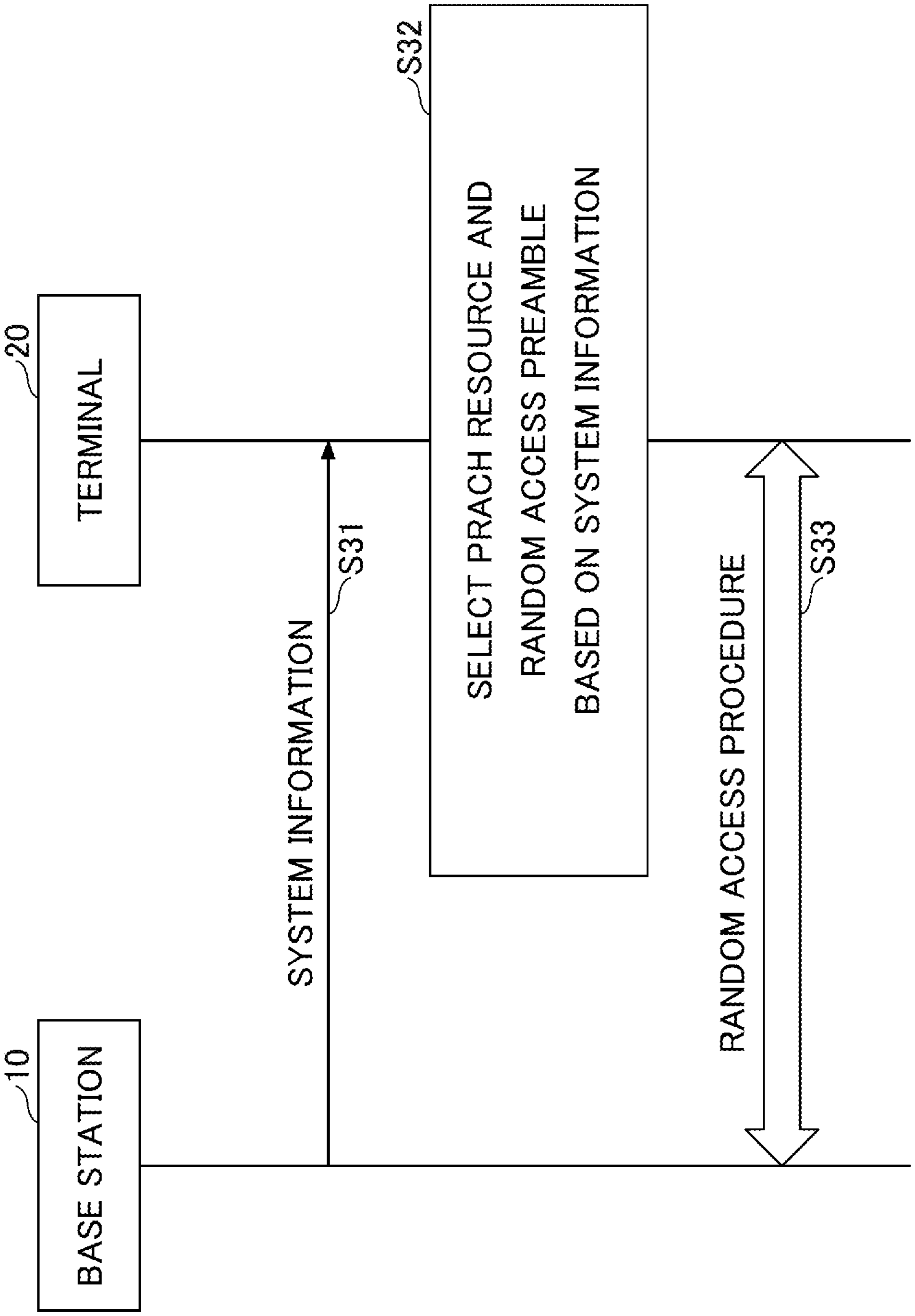
FIG. 4 is a sequence diagram illustrating an example of a random access procedure in an embodiment of the present invention.

FIG. 4 is a sequence diagram illustrating an example of a two-step random access procedure. An example of a random access procedure illustrated in FIG. 4 is a contention-based two-step random access procedure. The two-step random access procedure is supported to complete the random access procedure in a shorter time than the four-step random access procedure. In step S21, the terminal 20 transmits a random access preamble and a UE identifier as MsgA to the base station 10. Additionally, other data may be included in the MsgA. MsgA corresponds to Msg1 and Msg3 in a four-step random access procedure. Subsequently, the base station 10 transmits a random access response and a collision resolution identifier to the terminal 20 as MsgB (S22). MsgB corresponds to Msg2 and Msg4 in a four-step random access procedure. When the collision resolution using a UE identifier and a collision resolution identifier is successful, the random access procedure is successfully completed. The adoption of a two-step random access procedure is expected to have a lower delay and lower power consumption compared to a four-step random access procedure.

In 3GPP standardization, as RedCapUE, a new device type with lower cost and lower complexity than eMBB (enhanced Mobile Broadband) devices or URLLC (Ultra-Reliable and Low Latency Communications) devices is being discussed. Also, in the 3GPP standardization, a device that repeatedly transmits Msg3 in a random access procedure (hereinafter referred to as "CovEnhUE") is being discussed in the discussions of NR coverage enhancements.

The RedCapUE may be defined as a terminal 20 that supports or does not support at least one of the following UE capabilities: {transmit/receive bandwidth, number of receive antennas, number of DL-MIMO layers, half-duplex FDD, and multiple modulation values}.

Note that the CovEnhUE may be defined as a terminal 20 having the UE capability pertaining to the coverage improvement technology for at least one of {PUSCH, PUCCH, Msg3}.

For example, discussions have been performed for: the Layer 1 capability for identifying RedCapUE; an operation of applying the Layer 1 capability for RedCapUE only to RedCapUE and not applying to the non-RedCapUE terminal 20; and an operation of not applying capabilities particularly related to carrier aggregation, dual connectivity, and wider bandwidth to RedCapUE, the capabilities being included by the non-RedCapUE terminal 20.

When identification of RedCapUE is performed by the base station 10, for example, the identification may be performed at the time of Msg 1 transmission in a random access procedure, the identification may be performed at the time of Msg 3 transmission, the identification may be performed after the Msg4 response, or the identification may be performed at the time of MsgA transmission. On the other hand, in a case of applying coverage improvement techniques in Msg2 or Msg3, RedCapUE is required to be identified at the time of Msg1 or PRACH transmission.

Also, because the CovEnhUE supports coverage enhancement, for example, by repeated transmission of Msg3, the base station 10 needs to identify CovEnhUE at the time of Msg1 or PRACH transmission.

Thus, for each of RedCapUE and CovEnhUE, the base station 10 may identify the terminal 20 by using, for example, a separate initial UL-BWP (Bandwidth Part), a separate PRACH resource, a separate PRACH preamble, and the like. In addition, the base station 10 may transmit the indication pertaining to the identification method to the terminal. In addition, the terminal 20 may perform an operation assuming the identification method.

FIG. 4 is a sequence diagram illustrating an example of a random access procedure in an embodiment of the present invention. In step S31, the base station 10 transmits system information to the terminal 20. In subsequent step S32, the terminal 20 selects a PRACH resource and a random access preamble based on the received system information. In subsequent step S33, the terminal 20 transmits Msg1 or MsgA to base station 10 using the selected PRACH resource and the random access preamble, and the terminal 20 and the base station 10 initiate the random access procedure.

In step S31 above, which of 1) to 5) illustrated below is to be configured to the terminals 20 classified as RedCapUE and CovEnhUE may be indicated by the base station 10 via the system information, or which of 1) to 5) is to be configured or applied may be specified in the specifications in advance. The existing UE may be a UE that performs the initial access procedure in the NR release 15.

1) The initial UL-BWP different from that of the existing UE
2) The initial UL-BWP that is the same as that of the existing UE and the PRACH resource that is different from that of the existing UE
3) The initial UL-BWP and the PRACH resource that are the same as those of the existing UE, and the PRACH preamble that is different from that of the existing UE
4) The initial UL-BWP, the PRACH resource and the PRACH preamble that are the same as those of the existing UE are applied, and a specific OCC (Orthogonal Cover Code) pattern is applied at the time of repeated transmission
5) The initial UL-BWP, the PRACH resource and the PRACH preamble that are the same as those of the existing UE are applied, and an OCC (Orthogonal Cover Code) pattern is not applied at the time of repeated transmission In addition, in step S31, MIB and/or SIBx (x=1, 2, . . . ) may be used for the configuration or indication from the base station 10 to the terminal 20. For example, when one bit in a specific area of the MIB is 1, which of the above 1) to 5) is to be applied may be indicated by a specific parameter of the SIBx. For example, when one bit in a specific area of the MIB is 0, which of the above 1) to 5) is to be applied is not required to be indicated by a specific parameter of the SIBx.

In step S32 above, the terminal 20 may select a PRACH resource and a PRACH preamble based on the configuration indicated by the base station 10, and in step S33 above, the terminal 20 may transmit the PRACH to the base station 10. The terminal 20 that has transmitted the PRACH may assume that the information related to the coverage improvement of Msg2 may be indicated via PDCCH that schedules the Msg2 (RAR PDSCH). In addition, the terminal 20 that has transmitted the PRACH may assume that the information related to the coverage improvement of the Msg3 may be indicated by the Msg2 that schedules the Msg3 (PUSCH).

Note that the information related to the coverage improvement may include, for example, scaling of the TBS (Transport Block Size), the DMRS (Demodulation Reference Signal) configuration, the number of repeated transmissions, frequency hopping, etc.

In addition, which of 1) to 5) above is to be applied to RedCapUE and CovEnhUE may be specified in the specifications in advance. For example, the above 1) may be applied to RedCapUE and the above 2) may be applied to CovEnhUE.

In addition, the terminals 20 that are RedCapUE and CovEnhUE may transmit the PRACH by reading differently the configurations relating to the existing PRACH transmission based on the above-described 1) to 5). For example, when using the initial UL-BWP different from that of the existing UE in 1) above, the PRACH resource in the initial UL-BWP configured to the existing UE may be shifted by X PRBs. X may be the number of PRBs in the initial UL-BWP.

The terminal 20 that has transmitted PRACH by reading differently the configuration related to PRACH transmission may assume that the information related to the Msg2 coverage improvement is to be indicated via the PDCCH that schedules Msg2 (RAR PDSCH). The terminal 20 that has transmitted the PRACH may assume that the information related to the coverage improvement of the Msg3 is to be indicated via the Msg2 that schedules the Msg3 (PUSCH).

The above-described operations involving the PRACH transmission of RedCapUE and CovEnhUE are not limited to RedCapUE and CovEnhUE, and may be applied to terminals 20 that support a particular UE capability or to terminals 20 that do not support a particular UE capability. For example, the above-described operations involving PRACH transmission of RedCapUE and CovEnhUE may be applied to a UE that supports UE capability of high-speed movement.

In addition, the above 1) to 5) may be different or the same between UEs with different UE capabilities. For example, the above 1) may be applied to both RedCapUE and CovEnhUE, or, the above 2) may be applied to RedCapUE and the above 3) may be applied to CovEnhUE.

According to the embodiment described above, the terminal 20 can indicate, to the base station 10, that the terminal itself is RedCapUE or CovEnhUE by transmitting PRACH based on system information or specifications.

That is, a specific type of terminal can be identified at the time of performing the random access procedure in a wireless communication system.

(Device Configuration)

Next, a functional configuration example of the base station 10 and the terminal 20 for performing the processes and operations described above will be described. The base station 10 and the terminal 20 include functions for executing the embodiments described above. However, the base station 10 and the terminal 20 may each comprise only one of the functions of an embodiment.

<Base Station 10>

Figure 5:
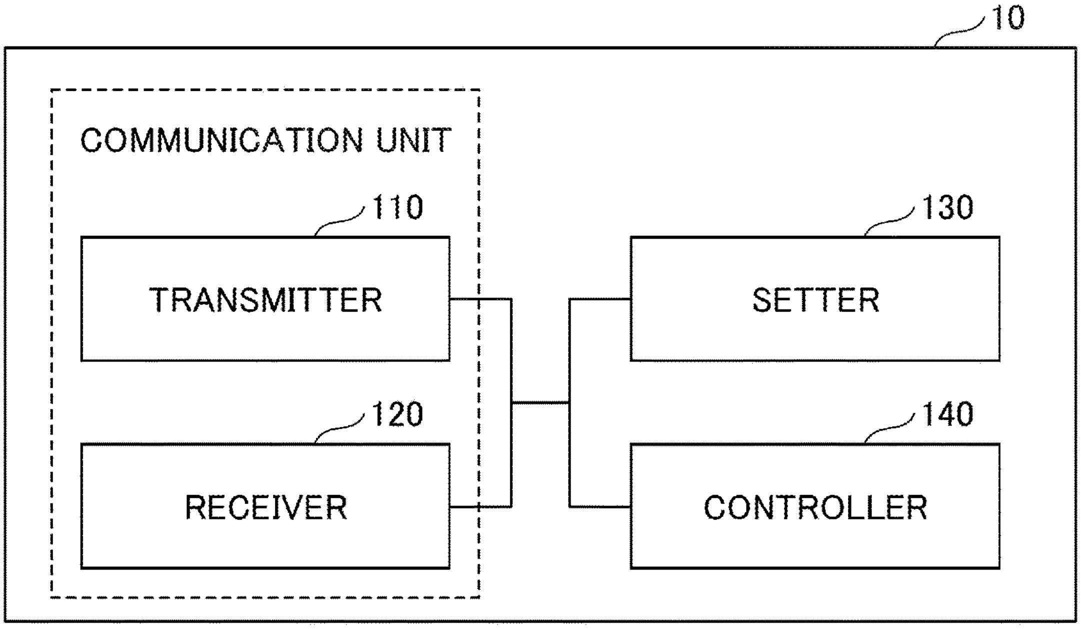
FIG. 5 is a drawing illustrating an example of a functional configuration of a base station 10 in an embodiment of the present invention.

FIG. 5 is a diagram illustrating an example of a functional configuration of the base station 10. As illustrated in FIG. 5, the base station 10 includes a transmitter 110, a receiver 120, a setter 130, and a controller 140. The functional configuration illustrated in FIG. 5 is only one example. If the operation according to the embodiments of the present invention can be performed, the function category and the name of the function unit may be anything. The transmitter 110 and the receiver 120 may be referred to as a communication unit.

The transmitter 110 includes a function for generating a signal to be transmitted to the terminal 20 side and transmitting the signal wirelessly. The receiver 120 includes a function for receiving various signals transmitted from the terminal 20 and acquiring, for example, information of a higher layer from the received signals. The transmitter 110 has a function to transmit NR-PSS, NR-SSS, NR-PBCH, DL/UL control signals, DL data, and the like to the terminal 20. The transmitter 110 transmits the setting information described in the embodiment.

The setter 130 stores the preset setting information and various setting information to be transmitted to the terminal 20 in the storage device and reads the preset setting information from the storage device if necessary. For example, the controller 140 allocates resources and controls the entire base station 10. A function unit related to signal transmission in the controller 140 may be included in the transmitter 110, and a function unit related to signal reception in the controller 140 may be included in the receiver 120. The transmitter 110 and the receiver 120 may be called a transmitter and a receiver, respectively.

<Terminal 20>

Figure 6:
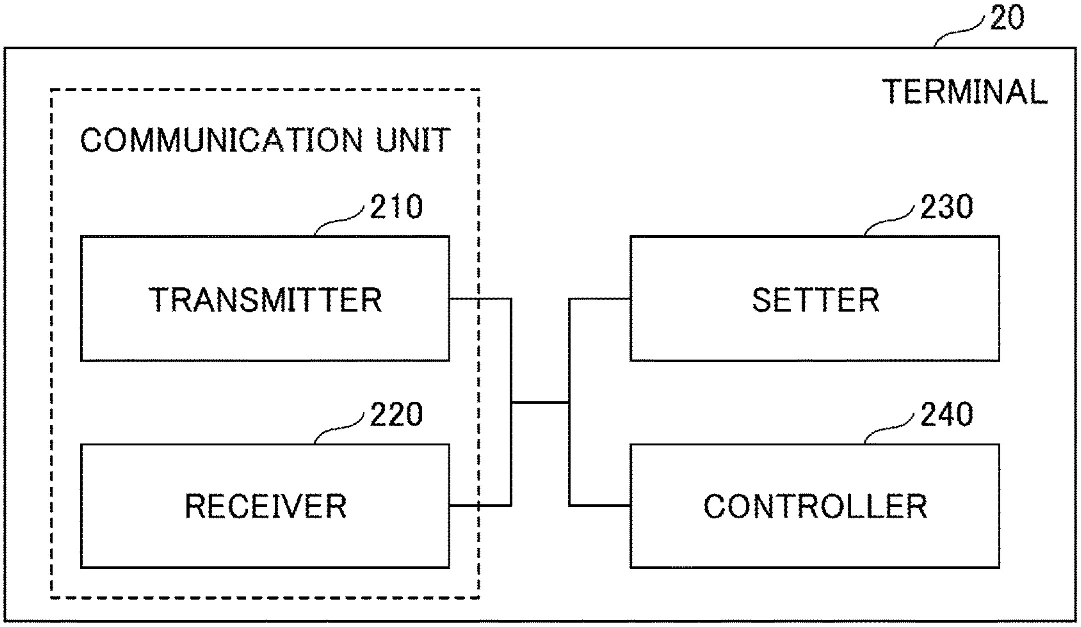
FIG. 6 is a drawing illustrating an example of a functional configuration of a terminal 20 in an embodiment of the present invention.

FIG. 6 is a diagram illustrating an example of a functional configuration of the terminal 20. As illustrated in FIG. 6, the terminal 20 includes a transmitter 210, a receiver 220, a setter 230, and a controller 240. The functional configuration illustrated in FIG. 6 is only one example. If the operation according to the embodiments of the present invention can be performed, the function category and the name of the function unit may be anything. The transmitter 210 and the receiver 220 may be called a communication unit.

The transmitter 210 creates a transmission signal from the transmission data and wirelessly transmits the transmission signal. The receiver 220 receives various signals wirelessly and acquires signals from higher layers from the received signal of the physical layer. The transmitter 210 transmits the HARQ-ACK, and the receiver 220 receives the setting information described in the embodiment.

The setter 230 stores various setting information received from the base station 10 by the receiver 220 in the storage device and reads it from the storage device as necessary. The setter 230 also stores the preset setting information. The controller 240 controls the entire terminal 20. A function unit related to signal transmission in the controller 240 may be included in the transmitter 210, and a function unit related to signal reception in the controller 240 may be included in the receiver 220. The transmitter 210 and the receiver 220 may be called a transmitter and a receiver, respectively.

(Hardware Configuration)

Block diagrams (FIGS. 5 and 6) used in the description of the above embodiments illustrate blocks of functional units. These functional blocks (components) are implemented by any combination of hardware and/or software. In addition, the implementation method of each function block is not particularly limited. That is, each functional block may be implemented using a single device that is physically or logically combined, or two or more devices that are physically or logically separated may be directly or indirectly connected (e.g., using wired, wireless, etc.) and implemented using these multiple devices. The functional block may be implemented by combining software with the device or devices.

Functions include, but are not limited to, judgment, determination, calculation, processing, derivation, research, search, verification, reception, transmission, output, access, resolution, selection, establishment, comparison, assumption, expectation, and deeming; broadcasting, notifying, communicating, forwarding, configuring, reconfiguring, allocating, mapping, and assigning. For example, a functional block (component) that functions to transmit is called a transmitting unit or a transmitter. In either case, as described above, the realization method is not particularly limited.

Figure 7:
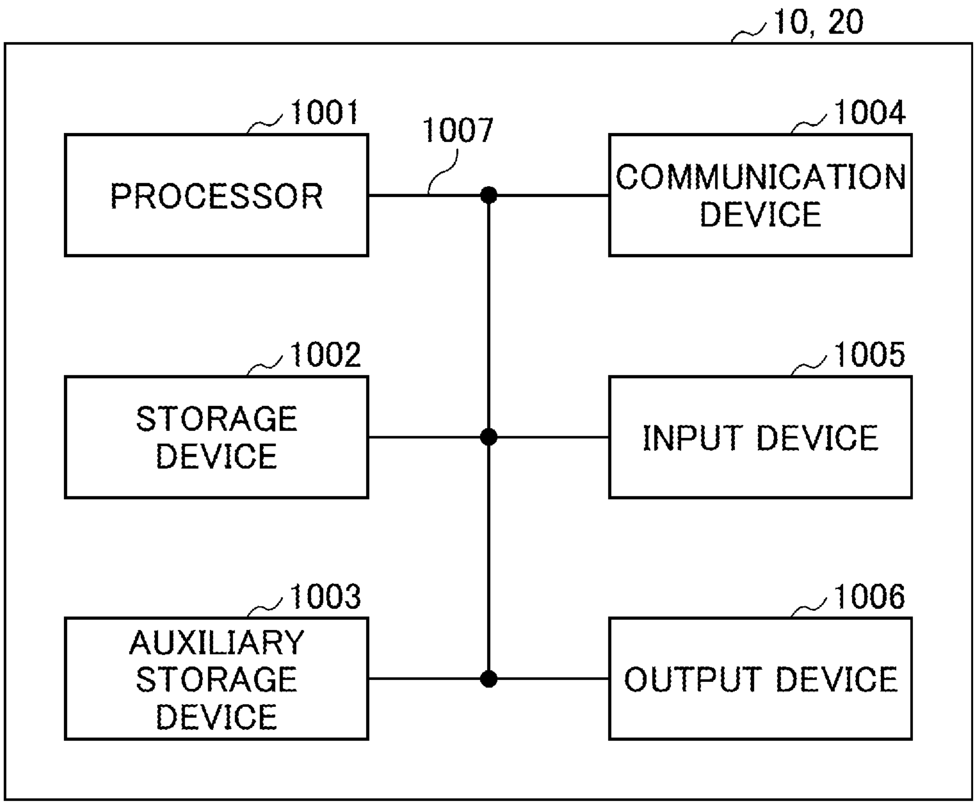
FIG. 7 is a drawing illustrating an example of a hardware configuration of the base station 10 or the terminal 20 according to an embodiment of the present invention.

For example, the base station 10, terminal 20, etc., according to an embodiment of the present disclosure may function as a computer for processing the radio communication method of the present disclosure. FIG. 7 is a diagram illustrating an example of the hardware configuration of the base station 10 and the terminal 20 according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as circuits, devices, units, etc. The hardware configuration of the base station 10 and terminal 20 may be configured to include one or more of the devices illustrated in the figure or may be configured without some of the devices.

The functions in the base station 10 and the terminal 20 are realized by performing operations by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

The processor 1001 operates, for example, an operating system to control the entire computer. The processor 1001 may be comprised of a central processing unit (CPU) including an interface with peripheral devices, a controller, an arithmetic unit, a register, and the like. For example, the above-described controller 140, controller 240, and the like may be implemented by the processor 1001.

The processor 1001 reads out a program (program code), software module, data, or the like from at least one of the auxiliary storage device 1003 and the communication device 1004 to the storage device 1002 and performs various processing in accordance with the above. As a program, a program that causes a computer to execute at least a part of the operation described in the above-described embodiment is used. For example, the controller 140 of the base station 10 illustrated in FIG. 5 may be stored in the storage device 1002 and implemented by a control program operating in the processor 1001. For example, the controller 240 of the terminal 20 illustrated in FIG. 6 may be stored in the storage device 1002 and implemented by a control program operating in the processor 1001. Although the foregoing processes have been described and executed by one processor 1001, they may be executed simultaneously or sequentially by two or more processors 1001. The processor 1001 may be implemented by one or more chips. The program may be transmitted from the network via a telecommunication line.

The storage device 1002 is a computer-readable recording medium and may be comprised of at least one of, for example, ROM (Read Only Memory), EPROM (Erasable Programmable ROM), EEPROM (Electrically Erasable Programmable ROM), RAM (Random Access Memory), and the like. The storage device 1002 may be referred to as a register, cache, main memory (main memory), or the like. The storage device 1002 can store programs (program codes), software modules, etc., executable to implement a communication method according to an embodiment of the present disclosure.

The auxiliary storage device 1003 is a computer-readable recording medium and may comprise at least one of an optical disk, such as a CD-ROM (Compact Disc ROM), a hard disk drive, a flexible disk, a magneto-optical disk (e.g., a compact disk, a digital versatile disk, a Blu-ray disk), a smart card, a flash memory (e.g., a card, a stick, a keydrive), a floppy disk, a magnetic strip, and the like. The storage medium described above may be, for example, a database, a server, or other suitable medium that includes at least one of a storage device 1002 and an auxiliary storage device 1003.

The communication device 1004 is a hardware (transmitter-receiver) for performing communication between computers via at least one of a wired network and a wireless network, and is also referred to as a network device, a network controller, a network card, a communication module, or the like. The communication device 1004 may comprise a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transceiving unit, the transmission line interface, and the like may be implemented by the communication device 1004. Transmitters and receptacles may be physically or logically isolated implementations of the transmitters and receivers.

The input device 1005 is an input device (e.g., a keyboard, mouse, microphone, switch, button, sensor, etc.) that accepts external input. Output device 1006 is an output device (e.g., a display, speaker, LED lamp, etc.) that implements an external output. The input device 1005 and the output device 1006 may have an integral configuration (for example, a touch panel).

Each device, such as processor 1001 and storage device 1002, is connected by a bus 1007 for communicating information. Bus 1007 may be constructed using a single bus or may be constructed using different buses between devices.

The base station 10 and terminal 20 may also include hardware such as a microprocessor, a digital signal processor (DSP), an ASIC (Application Specific Integrated Circuit), a PLD (Programmable Logic Device), an FPGA (Field Programmable Gate Array), and some or all of the functional blocks may be realized by the hardware. For example, processor 1001 may be implemented using at least one of these types of hardware.

(Summary of Embodiments)

As described above, according to an embodiment of the present invention, there is provided a terminal. The terminal includes: a receiver configured to receive system information including information pertaining to a random access procedure from a base station, a controller configured to select a resource used for random access based on the information pertaining to the random access procedure and a type of the terminal itself, and a transmitter configured to transmit a random access preambles to the base station using the selected resource, wherein the type of the terminal itself is a reduced-function terminal type or an enhanced-coverage terminal type.

With the above configuration, the terminal 20 can indicate, to the base station 10, that the terminal itself is RedCapUE or CovEnhUE by transmitting PRACH based on the system information. That is, a specific type of terminal can be identified at the time of performing a random access procedure in a wireless communication system.

The information pertaining to the random access procedure may include at least one of an initial uplink BWP (Bandwidth part), a PRACH (Physical Random Access Channel) resource, a random access preamble, and an OCC (Orthogonal Cover Code) pattern to be applied at a time of repeated transmission of the PRACH. With this configuration, the terminal 20 can indicate, to the base station 10, that the terminal itself is RedCapUE or CovEnhUE by transmitting PRACH based on the system information.

The controller may select the resource to be used for random access based on configurations including at least one of the initial uplink BWP, the PRACH resource, the random access preamble, and the OCC pattern to be applied at the time of repeated transmission of the PRACH included in the information pertaining to the random access procedure, the configurations of a reduced terminal type and the coverage enhanced terminal type being different from each other. With this configuration, the terminal 20 can indicate, to the base station 10, that the terminal itself is RedCapUE or CovEnhUE by transmitting PRACH based on the system information.

The controller may read differently a configuration pertaining to the random access procedure for a terminal having a type other than the type of the terminal itself based on the information pertaining to the random access procedure and select a resource to be used for random access. With this configuration, the terminal 20 can efficiently indicate, to the base station 10, that the terminal itself is RedCapUE or CovEnhUE by transmitting PRACH based on the PRACH resources configured to the existing UE.

Further, according to an embodiment of the present invention, there is provided a base station. The base station includes: a transmitter configured to transmit system information including information pertaining to a random access procedure to a terminal; a controller configured to determine a resource used for random access based on the information pertaining to the random access procedure and a type of the terminal; and a receiver configured to receive a random access preamble from the terminal using the determined resource, wherein the type of the terminal is a reduced-function terminal type or an enhanced-coverage terminal type.

With the above configuration, the terminal 20 can indicate, to the base station 10, that the terminal itself is RedCapUE or CovEnhUE by transmitting PRACH based on the system information. That is, a specific type of terminal can be identified at the time of performing the random access procedure in a wireless communication system.

Further, according to an embodiment of the present invention, there is provided a communication method performed by a terminal. The communication method includes: receiving system information including information pertaining to a random access procedure from a base station; selecting a resource to be used for random access based on the information pertaining to the random access procedure and a type of the terminal itself; and transmitting a random access preamble to the base station using the selected resource, wherein the type of the terminal itself is a reduced-function terminal type or an enhanced-coverage terminal type.

With the above configuration, the terminal 20 can indicate, to the base station 10, that the terminal itself is RedCapUE or CovEnhUE by transmitting PRACH based on the system information. That is, a specific type of terminal can be identified at the time of performing a random access procedure in a wireless communication system.

(Supplement to Embodiments)

Thus, although embodiments of the present invention have been described, the disclosed invention is not limited to such embodiments, and various modifications, modifications, alternatives, substitutions, etc. will be understood by those skilled in the art. Specific numerical examples have been used to facilitate understanding of the invention, but unless otherwise indicated, they are merely examples and any appropriate values may be used. Classification of items in the above description is not essential to the present invention, and the items described in two or more items may be used in combination as needed, or the items described in one item may be applied to the items described in another item (unless there is a conflict). The functional or processing unit boundaries in the functional block diagram do not necessarily correspond to the physical part boundaries. The operation of the plurality of functions may be performed physically by one component, or the operation of one function may be performed physically by the plurality of components. As for the processing procedure described in the embodiment, the order of the processing may be changed unless there is no conflict. For convenience of process description, the base station 10 and the terminal 20 have been described using a functional block diagram, but such devices may be implemented in hardware, software, or a combination thereof. Software operated by a processor of the base station 10 in accordance with embodiments of the present invention and software operated by a processor of the terminal 20 in accordance with embodiments of the present invention may be stored in random access memory (RAM), flash memory, read only memory (ROM), EPROM, EEPROM, register, hard disk (HDD), removable disk, CD-ROM, database, server, or any other suitable storage medium.

Information may also be communicated in other ways, as well as in the manner/embodiments described in this disclosure. For example, indication of information may be implemented by physical layer signaling (e.g., DCI (Downlink Control Information), UCI (Uplink Control Information), upper layer signaling (e.g., RRC (Radio Resource Control) signaling, MAC (Medium Access Control) signaling, MIB (Master Information Block), SIB (System Information Block)), other signals, or a combination thereof. The RRC signaling may also be referred to as an RRC message, for example, RRC Connection Setup (RRC Connection Setup) message, RRC Connection Reconstruction (RRC Connection Reconstruction) message, or the like.

Each aspect/embodiment described in this disclosure is as follows: LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000 UMB (Ultra Mobile Broadband), IEEE 802.11 (Wi-Fi), IEEE 802.16 (WiMAX), IEEE 802.20, UWB (Ultra-WideBand), and Bluetooth (Registered). It may be applied to at least one of the systems utilizing other appropriate systems and the next generation systems extended thereon. Multiple systems may also be applied in combination (e.g., at least one of LTE and LTE-A combined with 5G, etc.).

The processing procedures, sequences, flowcharts, etc. of each aspect/embodiment described herein may be reordered unless there is any conflict. For example, the methods described in the present disclosure are presented using exemplary sequences to present elements of the various steps and are not limited to the particular order presented.

The specific operations described herein as performed by the base station 10 may be performed by its upper node in some cases. In a network of one or more network nodes having a base station 10, it will be apparent that various operations performed for communication with terminal 20 may be performed by at least one of the base station 10 and other network nodes other than base station 10 (e.g., but not limited to MME, S-GW, etc.). Although the above illustrates that there is only one other network node other than the base station 10, the other network nodes may be a combination of multiple other network nodes (e.g., MME and S-GW).

The information or signals described in this disclosure can be output from a higher layer (or lower layer) to a lower layer (or higher layer). It may be input and output through multiple network nodes.

Input and output information may be stored in a specific location (e.g., memory) or managed using management tables. Input and output information may be overwritten, updated, or added. The output information may be deleted. The input information or the like may be transmitted to another device.

The determination in this disclosure may be made by a value (0 or 1) expressed in 1 bit, by a true or false value (Boolean: true or false), or by a numerical comparison (e.g., a comparison with a predetermined value).

Software should be broadly interpreted to mean, whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and the like.

Software, instructions, information, and the like may also be transmitted and received via a transmission medium. For example, when software is transmitted from a website, server, or other remote source using at least one of wired technology (such as coaxial cable, fiber optic cable, twisted pair, digital subscriber line (DSL)) and wireless technology (infrared, microwave, etc.), at least one of these wired technology and wireless technology is included within the definition of a transmission medium.

The information, signals and the like described in this disclosure may be represented using any of a variety of different techniques. For example, data, instructions, commands, information, signals, bits, symbols, chips, etc., which may be referred to throughout the above description may be represented by voltages, currents, electromagnetic waves, magnetic fields or magnetic particles, optical fields or photons, or any combination thereof.

The terms described in the present disclosure and those necessary for understanding the present disclosure may be replaced by terms having the same or similar meanings. For example, at least one of the channels and the symbols may be a signal (signaling). The signal may also be a message. The component carrier (CC) may also be referred to as a carrier frequency, cell, frequency carrier, or the like.

As used in this disclosure, the terms "system" and "network" are used interchangeably.

The information, parameters, and the like described in the present disclosure may also be expressed using absolute values, relative values from predetermined values, or they may be expressed using corresponding separate information. For example, the wireless resources may be those indicated by an index.

The name used for the parameters described above is not restrictive in any respect. In addition, the mathematical equations using these parameters may differ from those explicitly disclosed in this disclosure. Since the various channels (e.g., PUCCH, PDCCH, etc.) and information elements can be identified by any suitable name, the various names assigned to these various channels and information elements are not in any way limiting.

In this disclosure, terms such as a "BS (Base Station)", a "base station", a "wireless base station", a "fixed station", "a NodeB", an "eNodeB (eNB)", a "gNodeB (gNB)", an "access point", a "transmission point", a "reception point", a "transmission/reception point", a "cell", a "sector", a "cell group", a "carrier", a "component carrier", and the like may be used interchangeably. The base station may also be referred to as a macrocell, a small cell, a femtocell, a picocell, or the like.

The base station can accommodate one or more (e.g., three) cells. If the base station accommodates a plurality of cells, the entire coverage area of the base station can be divided into a plurality of smaller areas, each of which can also provide communications services via a base station subsystem (e.g., a small indoor base station (RRH) or Remote Radio Head). The term "cell" or "sector" refers to part or all of the coverage area of at least one of the base station and base station subsystem that provides communications services at the coverage.

In this disclosure, terms such as "mobile station (MS)", "user terminal", "user equipment (UE)", "terminal", and the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of the base stations and the mobile station may be referred to as a transmitter, receiver, communication device, or the like. At least one of the base station and the mobile station may be a device mounted on the mobile body, the mobile body itself, or the like. The mobile body may be a vehicle (e.g., a car, an airplane, etc.), an unmanned mobile body (e.g., a drone, an automated vehicle, etc.), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be read by the user terminal. For example, various aspects/embodiments of the present disclosure may be applied for a configuration in which communication between base stations and user terminals is replaced by communication between multiple terminals 20 (e.g., may be referred to as D2D (Device-to-Device), V2X (Vehicle-to-Everything), etc.). In this case, the terminal 20 may have the functions provided by the base station 10 described above. The phrases "upstream" and "downstream" may also be replaced by the phrases corresponding to terminal-to-terminal communication (e.g., "side"). For example, an upstream channel, a downstream channel, or the like may be read by a side channel.

Similarly, the user terminal in the present disclosure may be read by the base station. In this case, the base station may have the functions provided by the user terminal described above.

As used in this disclosure, the terms "judgment (determining)" and "decision (determining)" may encompass a wide variety of operations. "Judgment" includes, for example, judging, calculating, computing, processing, deriving, investigating, looking up, searching, inquiry (e.g., searching in tables, databases, or other data structures), ascertaining, and so forth. "Judgment" and "decision" may also include receiving (e.g., receiving information), transmitting (e.g., sending information), input, output, and accessing (e.g., accessing data in memory) as "judged" and "determined", and the like. "Judgment" and "decision" may also include "judgment" and "decision" regarding matters such as resolving, selecting, choosing, establishing, comparing, etc. That is, the "judgment" and the "decision" may include deeming some action to be "judgment" and "determination." "decision" may be read as "assuming," "expecting," or "considering," etc.

The term "connected" or "coupled" or any variation thereof means any direct or indirect connection between two or more elements and may include the presence of one or more intermediate elements between two elements "connected" or "coupled" with each other. The coupling or connection between the elements may be physical, logical, or a combination of these. For example, "connection" may be read as "access". As used in the present disclosure, the two elements may be thought of as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "solely based on" unless otherwise specified. In other words, the expression "based on" means both "solely based on" and "at least based on".

Any reference to an element using a designation such as "first" or "second" as used in the present disclosure does not generally limit the amount or order of those elements. These designations can be used in the present disclosure as a convenient way to distinguish between two or more elements. Thus, references to the first and second elements do not imply that only two elements may be employed or that the first element must in some way precede the second element.

"Means" in the configuration of each of the above devices may be replaced by "parts," "circuits," "devices," etc.

When the terms "include", "including" and variations thereof are used in the present disclosure, these terms are intended to be comprehensive as well as the term "comprising". Moreover, the term "or" as used in this disclosure is not intended to be an exclusive-OR.

The wireless frame may consist of one or more frames in the time domain. Each frame or frames in the time domain may be referred to as subframes. The subframe may further comprise one or more slots in the time domain. The subframe may be a fixed length of time (e.g., 1 ms) independent of the numerology.

The numerology may be a communication parameter that is applied to at least one of the transmission and reception of a signal or channel. The numerology may indicate at least one of, for example, SubCarrier Spacing (SCS), bandwidth, symbol length, cyclic prefix length, transmit time interval (TTI), number of symbols per TTI, wireless frame configuration, specific filtering processing performed by the transceiver in the frequency domain, and specific windowing processing performed by the transceiver in the time domain.

The slot may consist of one or more symbols in the time domain, such as OFDM (Orthogonal Frequency Division Multiplexing) symbols, SC-FDMA (Single Carrier Frequency Division Multiple Access symbols, and the like. The slot may be in time units based on a numerology.

The slots may include a plurality of minislots. Each minislot may be comprised of one or more symbols in the time domain. The minislot may also be referred to as a subslot. The minislots may consist of fewer symbols than the slots. A PDSCH (or PUSCH) transmitted in time units greater than a minislot may be called a PDSCH (or PUSCH) mapping type A. PDSCH (or PUSCH) transmitted using minislots may be referred to as PDSCH (or PUSCH) mapping type B.

Radio frames, subframes, slots, minislots and symbols all represent time units for transmitting signals. Radio frames, subframes, slots, minislots and symbols, respectively, may be designated separately.

For example, one subframe may be referred to as a Transmission Time Interval (TTI), multiple consecutive subframes may be referred to as a TTI, and one slot or one minislot may be referred to as a TTI. That is, at least one of the subframes and the TTI may be a subframe (1 ms) in an existing LTE, a period shorter than 1 ms (e.g., 1-13 symbols), or a period longer than 1 ms. The unit representing the TTI may be referred to as a slot, a minislot, or the like, rather than a subframe.

The TTI refers, for example, to the minimum time unit for scheduling in wireless communication. For example, in an LTE system, a base station schedules each terminal 20 to allocate wireless resources (such as frequency bandwidth, transmit power, etc. that can be used in each terminal 20) in TTI units. The definition of TTI is not limited to this.

The TTI may be a transmission time unit, such as a channel-encoded data packet (transport block), code block, codeword, or the like, or may be a processing unit, such as a scheduling or link adaptation. When a TTI is provided, the time interval (e.g., the number of symbols) during which the transport block, code block, codeword, or the like is actually mapped may be shorter than the TTI.

If one slot or one minislot is referred to as a TTI, one or more TTIs (i.e., one or more slots or one or more minislots) may be the minimum time unit for scheduling. The number of slots (minislots) constituting the minimum time unit of the scheduling may also be controlled.

A TTI having a time length of 1 ms may be referred to as a TTI (usually a TTI in LTE Rel. 8-12), a normal TTI, a long TTI, a normal subframe, a normal subframe, a long subframe, a slot, and the like. A TTI that is typically shorter than a TTI may be referred to as a shortened TTI, a short TTI, a partial TTI (partial or fractional TTI), a shortened subframe, a short subframe, a minislot, a subslot, a slot, or the like.

The long TTI (e.g., usually TTI, subframe, etc.) may be interpreted as a TTI having a time length exceeding 1 ms, and the short TTI (e.g., shortened TTI, etc.) may be interpreted as a TTI having a TTI length less than the TTI length of the long TTI and a TTI length greater than 1 ms.

The resource block (RB) is a time domain and frequency domain resource allocation unit and may include one or more consecutive subcarriers in the frequency domain. The number of subcarriers included in the RB may be the same regardless of the numerology, for example 12. The number of subcarriers included in the RB may be determined on the basis of numerology.

The time domain of the RB may also include one or more symbols, which may be 1 slot, 1 minislot, 1 subframe, or 1 TTI in length. One TTI, one subframe, etc., may each consist of one or more resource blocks.

Note that one or more RBs may be referred to as physical resource blocks (PRBs), sub-carrier groups (SCGs), resource element groups (REGs), PRB pairs, RB pairs, and the like.

The resource block may also consist of one or more resource elements (RE). For example, 1 RE may be a wireless resource area of one sub-carrier and one symbol.

The bandwidth portion (which may also be referred to as a partial bandwidth, etc.) may represent a subset of consecutive common RB (common resource blocks) for a given numerology in a carrier. Here, the common RB may be identified by an index of RB relative to the common reference point of the carrier. A PRB is defined in a BWP and may be numbered within that BWP.

BWP may include BWP for UL (UL BWP) and BWP for DL (DL BWP). One or more BWPs may be configured in one carrier for the terminal 20.

At least one of the configured BWPs may be active, and the terminal 20 may not assume to transmit or receive predetermined signals/channels outside the active BWP. The terms "cell" and "carrier" in this disclosure may be replaced by "BWP."

Structures such as radio frames, subframes, slots, minislots, and symbols described above are exemplary only. For example, the number of subframes included in a wireless frame, the number of slots per subframe or wireless frame, the number of minislots included in the slot, the number of symbols and RBs included in the slot or minislot, the number of subcarriers included in the RB, the number of symbols in the TTI, the symbol length, the length of the cyclic prefix (CP) length, and the like may vary.

In the present disclosure, where an article is added by translation, for example a, an, and the, the disclosure may include that the noun following these articles is plural.

In this disclosure, the term "A and B are different" may mean "A and B are different from each other." Incidentally, the term may mean "A and B are different from C." Terms such as "separated" or "combined" may be interpreted as well as "different".

The aspects/embodiments described in the present disclosure may be used alone, used in combination, or switched with implementation. Notice of a given information (e.g. "X" notice) may also be given by implication (e.g. "no notice of the given information"), not explicitly.

The RedCapUE in this disclosure is an example of a reduced function terminal type. CovEnhUE is an example of a terminal type with enhanced coverage.

While the present disclosure has been described in detail above, those skilled in the art will appreciate that the present disclosure is not limited to the embodiments described in the present disclosure. The disclosure may be implemented as modifications and variations without departing from the spirit and scope of the disclosure as defined by the claims. Accordingly, the description of the present disclosure is for illustrative purposes only and is not intended to have any restrictive meaning with respect to the present disclosure.

The present international patent application is based on and claims priority to Japanese patent application No. 2021-009799, filed Jan. 25, 2021, the entire contents of which are hereby incorporated herein by reference.

EXPLANATION OF REFERENCE NUMERALS

10 base station
110 transmitter

120 receiver
130 setter
140 controller
20 terminal
210 transmitter
220 receiver
230 setter
240 controller
1001 processor
1002 storage device
1003 auxiliary storage device
1004 communication device
1005 input device
1006 output device

The invention claimed is:

1. A terminal comprising:

a receiver that receives, from a base station, configuration information related to a random access procedure, the configuration information including information indicating that one or more features including at least one coverage enhancement feature are associated with a set of resources for random access;

a controller that selects a resource for random access from at least one of a separate BWP (Bandwidth Part), a separate PRACH (Physical Random Access Channel) resource, or a separate PRACH preamble, wherein the separate BWP, the separate PRACH resource, or the separate PRACH preamble is included in the set of resources for random access associated with a coverage enhancement feature that is included among the coverage enhancement features included in the configuration information and supported by the terminal; and a transmitter that transmits, to the base station, a random access preamble using the selected resource, wherein at least one coverage enhancement feature includes repetition for Msg3 transmission in the random access procedure.

2. The terminal according to claim 1, wherein the receiver further receives, from the base station, a random access response to the transmission of the random access preamble, and the random access response includes information related to a number of repetitions for the Msg3 transmission.

3. The terminal according to claim 2, wherein the transmitter further performs repeated transmission of Msg3 based on the number of repetitions for the Msg3 transmission.

4. The terminal according to claim 1, wherein the separate BWP, the separate PRACH resource, and the separate PRACH preamble are associated with the coverage enhancement feature.

5. A base station comprising:

a transmitter that transmits, to a terminal, configuration information related to a random access procedure, the configuration information including information indicating that one or more features including at least one coverage enhancement feature are associated with a set of resources for random access; and a receiver that receives, from the terminal, a random access preamble, wherein the random access preamble is transmitted using a resource for random access selected by the terminal, wherein the selected resource is at least one of a separate BWP (Bandwidth Part), a separate PRACH (Physical Random Access Channel) resource, or a separate PRACH preamble, the separate BWP, the separate PRACH resource, or the separate PRACH preamble is included in the set of resources for random access associated with a coverage enhancement feature that is included among the coverage enhancement features included in the configuration information and supported by the terminal, and at least one coverage enhancement feature includes repetition for Msg3 transmission in the random access procedure.

* * * * *